Dec. 5, 1944.    G. GUANELLA    2,364,210
METHOD AND APPARATUS FOR SCRAMBLING SIGNALS
Filed May 8, 1942    4 Sheets-Sheet 1

Inventor:
Gustav Guanella,
By
Pierce + Scheffler,
Attorneys.

Dec. 5, 1944.   G. GUANELLA   2,364,210
METHOD AND APPARATUS FOR SCRAMBLING SIGNALS
Filed May 8, 1942   4 Sheets-Sheet 2

Dec. 5, 1944.   G. GUANELLA   2,364,210
METHOD AND APPARATUS FOR SCRAMBLING SIGNALS
Filed May 8, 1942   4 Sheets-Sheet 3

Patented Dec. 5, 1944

2,364,210

UNITED STATES PATENT OFFICE 2,364,210

METHOD AND APPARATUS FOR SCRAMBLING SIGNALS

Gustav Guanella, Zurich, Switzerland, assignor to "Patelhold" Patentverwertungs- & Elektro-Holding A.-G., Glarus, Switzerland Application May 8, 1942, Serial No. 442,246
In Switzerland May 10, 1941

31 Claims. (Cl. 179—1.5)

According to one known method for keeping signals secret, individual frequency bands of the signal which is to be scrambled are displaced by amounts which are constant or which alter continuously or suddenly at definite intervals of time. The various signal frequencies are according to this substitution replaced by certain other frequencies. The signal which is scrambled in this manner, after it has been transmitted, is made intelligible again by a corresponding shifting back of the frequency bands. With such a frequency substitution, the energy rhythm, that is the alteration of the signal with respect to time, is not altered. The fundamental waves also remain recognisable as a frequency difference of individual components of the scrambled signal. Experience has shown that with a certain amount of practice it is possible to understand at least part of a signal which is scrambled in this way.

With another known coding system the individual elements or units into which the signal is divided are scrambled in such a manner that elements which originally followed each other in sequence are displaced by unequal amounts as regards time. With this transposition method the energy rhythm is completely changed. On the other hand fractions of individual vowels can remain understandable. When the coded signal is heard, certain characteristic words can be guessed if the transposition as regards time of the signal elements is not large enough. Very large displacements as regards time of the individual elements result, however, in correspondingly long transmission times which may cause difficulties for two-way transmission.

A disadvantage of both the aforementioned methods is that short scrambled signal sections can be at least partly unscrambled after a number of attempts are made to change the frequency bands or the signal elements, so that such sections become intelligible after a short time.

The object of the present invention is to overcome the aforementioned disadvantages of the known systems by shifting the individual frequency bands of successive signal elements by varying frequency amounts and furthermore delaying them by varying amounts of time. Compared with the known frequency substitution this new method also includes scrambling as regards time, whereby the energy rhythm is destroyed and the possibility of decoding is eliminated. Compared with the known transposition system there is a transposition of the frequency bands. By this means it is impossible to recognise vowels and thus guess certain words.

The method according to the invention is explained first, and then by means of Figs. 1–8 of the accompanying drawings various constructional examples of arrangements for performing the method are referred to in detail.

The straight or unscrambled message $Z_0$ consisting of successive elements $a, b, c \ldots$ is expediently indicated as follows:

$$Z_0 = \begin{matrix} a_1 & b_1 & c_1 & d_1 & e_1 & f_1 & g_1 \\ a_2 & b_2 & c_2 & d_2 & e_2 & f_2 & g_2 \\ a_3 & b_3 & c_3 & d_3 & e_3 & f_3 & g_3 \end{matrix}$$

The indices 1, 2, 3 represent three frequency bands of equal width of the unscrambled message. The lowest frequencies, that is the unshifted frequency bands $a_1, b_1, c_1 \ldots$ of the signal elements $a, b, c \ldots$ are shown in the first line, the middle frequencies in the second line and the highest frequencies in the bottom line. The frequency bands characterised by the index or position of the lines can for instance cover the ranges 350–1050, 1050–1750, 1750–2450 cycles.

With the aforementioned transposition scrambling the following scrambled message $Z_1$ would result from the message $Z_0$:

$$Z_1 = \begin{matrix} d_1 & b_1 & f_1 & a_1 & c_1 & g_1 & e_1 \\ d_2 & b_2 & f_2 & a_2 & c_2 & g_2 & e_2 \\ d_3 & b_3 & f_3 & a_3 & c_3 & g_3 & e_3 \end{matrix}$$

The three frequency bands of each element are displaced here by the same amount as regards time. There is, however, no frequency shift because for instance the frequencies characterised by the index 1, that is to say originally the lowest frequencies $a_1, b_1, c_1 \ldots$ remain in the first line and are therefore also the lowest frequencies in the scrambled signal.

A certain increase in secrecy is to be expected if each frequency band were now subjected to a transposition scrambling according to a different code. Instead of $Z_1$ the following signal would then be obtained:

$$Z_2 = \begin{matrix} g_1 & b_1 & c_1 & e_1 & a_1 & f_1 & d_1 \\ f_2 & d_2 & b_2 & c_2 & e_2 & g_2 & a_2 \\ b_3 & a_3 & f_3 & e_3 & g_3 & d_3 & c_3 \end{matrix}$$

It is found, however, that the signal can be deciphered when only one frequency band is listened to, even after a transposition scrambling of the band. Attempts will therefore be made to decipher each individual frequency band by one of the known methods. By comparing the various deciphering results it is possible to obtain a certain check.

With the known substitution method the individual signal frequency bands are shifted by definite amounts. These amounts can be selected so that individual bands are transposed without the total frequency range being altered. When these transpositions vary after certain intervals of time the original signal $Z_0$ will then for instance be changed to the following scrambled signal $Z_3$:

$$Z_3 = \begin{matrix} a_1 & \overline{b_3} & c_2 & d_1 & \overline{e_1} & f_2 & g_1 \\ \overline{a_3} & \overline{b_1} & c_3 & \overline{d_2} & e_3 & \overline{f_3} & \overline{g_2} \\ a_2 & b_2 & \overline{c_1} & d_3 & \overline{e_2} & f_1 & \overline{g_3} \end{matrix}$$

In this case, for instance the frequency band $a_2$ of element $a$ is shifted into the high frequency range by adding a constant frequency from the intermediate range. For this reason it is shown in the third line. Furthermore inverted frequency bands can also be formed, these being indicated by overlining the frequency reference letters. The higher and lower frequencies of the original band will then form the low and high frequencies respectively of the new band. With this method there is no displacement of the elements with respect to time; the original order in time of the element components $a_1, b_1, c_1 \ldots, a_2, b_2, c_2 \ldots$ etc. remains unchanged. The energy rhythm is also unchanged and there is therefore a risk of unauthorized persons deciphering the message.

The shifting of the individual frequency bands of the message according to the invention by varying amounts of time and frequency can be achieved in a very simple manner by applying the aforementioned methods one after the other. Signal $Z_1$ which is subjected to a transposition scrambling could be further scrambled by a subsequent substitution scrambling. On the other hand signal $Z_3$ which is obtained by substitution scrambling can be subjected to a subsequent transposition scrambling. In both cases the following new signal $Z_4$ is obtained:

$$Z_4 = \begin{matrix} d_1 & \overline{b_3} & f_2 & a_1 & c_2 & g_1 & \overline{e_1} \\ \overline{d_2} & \overline{b_1} & \overline{f_3} & \overline{a_3} & c_3 & \overline{g_2} & e_3 \\ d_3 & b_2 & f_1 & a_2 & \overline{c_1} & \overline{g_3} & \overline{e_2} \end{matrix}$$

The intermediate frequency band $a_2$ of element $a$ which was originally first as regards time, is now fourth in the lowest line, that is in the range of high frequencies. Inverted bands are furthermore formed from other frequency bands, for instance $a_3$, and these are indicated by the overlines. The time sequence and also the frequency spectrum of the individual elements are thus changed. The energy rhythm and the possibility of understanding the vowels is thus destroyed and it appears impossible that the scrambled signal or parts of same can be directly understood. It should, however, be noticed that individual frequency bands of one element, for instance $d_1, d_2, d_3$ occur simultaneously even after scrambling.

Still greater secrecy can be obtained if a signal with unequally transposition scrambled frequency bands is subjected to a subsequent frequency substitution. For instance a new signal $Z_5$ results from signal $Z_2$:

$$Z_5 = \begin{matrix} f_2 & \overline{a_3} & b_2 & e_3 & a_1 & f_1 & a_2 \\ g_1 & \overline{b_1} & \overline{f_3} & c_2 & \overline{e_2} & d_3 & d_1 \\ \overline{b_3} & \overline{d_2} & \overline{c_1} & \overline{e_1} & \overline{g_2} & \overline{g_3} & c_3 \end{matrix}$$

The elements of this signal contain components from various original signal elements with varying frequency displacement. Thus for example the first element $(f_2, g_1, \overline{b_3})$ contains the intermediate frequency band $f_2$ of the original 6th element shifted into the lower frequency range and also the lower frequency band $g_1$ of the original 7th element shifted into the intermediate frequency range. A possible indication as to how the message might be deciphered may perhaps be seen in the fact that each scrambled element contains components having the characteristic numerals 1, 2 and 3, which shows that all three frequency bands of the original signal are represented in each scrambled element.

It is, however, also possible to subject signals $Z_3$ obtained by substitution to a subsequent transposition scrambling according to different coding plans. Thus for instance a new signal $Z_6$ will be obtained:

$$Z_6 = \begin{matrix} d_1 & \overline{b_3} & f_2 & a_1 & c_2 & g_1 & \overline{e_1} \\ e_3 & \overline{b_1} & \overline{g_2} & c_3 & \overline{a_3} & \overline{d_2} & \overline{f_3} \\ \overline{c_1} & a_2 & \overline{e_2} & d_3 & \overline{g_3} & f_1 & b_2 \end{matrix}$$

The successive elements in time of this signal can thus be formed by components which originate from two or three of the same frequency bands of the original signal. An aid to unauthorised deciphering might, however, be that each frequency band of the scrambled signal contains a component of each original signal element.

A greater degree of secrecy could be obtained by means of a further transposition scrambling of the signal $Z_5$ according to different coding plans or by means of a further substitution scrambling of signal $Z_6$. In both cases signal $Z_7$ could be obtained as follows:

$$Z_7 = \begin{matrix} e_3 & a_2 & f_2 & a_1 & \overline{a_3} & f_1 & b_2 \\ d_1 & \overline{b_1} & \overline{e_2} & d_3 & c_2 & g_1 & \overline{f_3} \\ \overline{c_1} & \overline{b_3} & \overline{g_2} & c_3 & \overline{g_3} & \overline{d_2} & \overline{e_1} \end{matrix}$$

The possibilities for unauthorised deciphering mentioned in connection with $Z_5$ and $Z_6$ do not exist in this case and the individual frequency bands of the original signal elements now appear apparently quite optionally transposed as regards time and frequency.

The scrambled signals $Z_5, Z_6, Z_7$ of which examples have been given, cannot be produced simply by an ordinary transposition scrambling and a subsequent ordinary substitution scrambling. A separate treatment of the various frequency bands is necessary or in other words in order to carry out the method of the invention means have to be provided which are not merely an aggregation of known arrangements.

When performing the method in practice it may be advisable to use an equal length of element for both scrambling processes. If a substitution change only occurs after two elements of the signal $Z_2$ which is scrambled by transposition, then signal $Z_5$ will be superseded by the following scrambled signal:

$$Z_8 = \begin{matrix} f_2 & d_2 & \overline{f_3} & \overline{e_3} & e_2 & g_2 & c_3 \\ g_1 & b_1 & \overline{c_1} & \overline{e_1} & \overline{g_3} & \overline{d_3} & a_2 \\ \overline{b_3} & \overline{a_3} & \overline{b_2} & \overline{c_2} & \overline{a_1} & f_1 & d_1 \end{matrix}$$

With the combined scrambling processes already explained in connection with signal $Z_7$ individual partial scramblings can be undertaken in accordance with a constant coding plan. As an example, consider the transposition of individual frequency bands by constant amounts of time, a frequency substitution according to a variable program occurring before and after the transposition. The signal $Z_3$ is formed by the first substitution. The transposition which follows, shifts for instance the first frequency band by a constant amount of time equal to 4 element lengths, the second frequency band by 2 element lengths and the third frequency band by one element length. Thus signal $Z_3$ forms an intermediate signal $Z_9$:

$$Z_9 = \begin{array}{cccccccccc} . & . & . & a_1 & \bar{b}_3 & c_2 & d_1 & \bar{e}_1 & f_2 & g_1 \\ . & . & \bar{a}_3 & \bar{b}_1 & c_3 & \bar{d}_2 & e_3 & \bar{f}_3 & \bar{g}_2 & . & . \\ . & a_2 & b_2 & \bar{c}_1 & d_3 & \bar{e}_2 & f_1 & \bar{g}_3 & . & . & . \end{array}$$

By means of a further substitution scrambling, signal $Z_{10}$ is obtained:

$$Z_{10} = \begin{array}{cccccccccc} . & . & b_2 & \bar{b}_1 & d_3 & \bar{b}_3 & f_1 & \bar{f}_2 & \bar{g}_2 & . & . \\ . & a_2 & . & . & \bar{c}_1 & a_1 & \bar{e}_2 & e_3 & \bar{g}_3 & \bar{e}_1 & . & g_1 \\ . & . & \bar{a}_3 & . & c_3 & \bar{d}_2 & c_2 & d_1 & . & f_2 & . \end{array}$$

Even with a knowledge of the individual transposition times such a signal can hardly be deciphered. A similar signal is obtained by delaying the original frequency bands by three different but constant amounts of time and then applying a substitution scrambling.

With the examples of the method which have been described the time and frequency amounts forming the basis of the individual shifting operations have been selected so that the frequency range of the scrambled signal does not differ from that of the original signal and that no components of the same frequency are superimposed. The scrambled signals can therefore be transmitted over the same channels as the unscrambled signals. In many cases, however, a transposition of the entire frequency range is desirable or admissible. The necessary measures to achieve this do not require any special explanation. In some cases the frequency channels available for the transmission are broader than the frequency range of the unscrambled message. The number of scrambled frequency bands can then be larger than the number of unscrambled bands. Gaps or repetitions will then occur in individual bands.

It must also be emphasized that it is possible to modify the examples described by dividing the unscrambled message into two, three or more bands which are then scrambled in the manner already explained. As the number of bands increase their frequency range will decrease and the degree of secrecy increases.

In the drawings that illustrate diagrammatically various embodiments of apparatus for carrying out the novel methods of the invention.

The length of the element depends upon the available scrambling and transmitting means. Very short element lengths demand exact synchronous operation of the apparatus and a minimum phase distortion during transmission. On the other hand the degree of secrecy increases as the length of element decreases.

Figure 1:
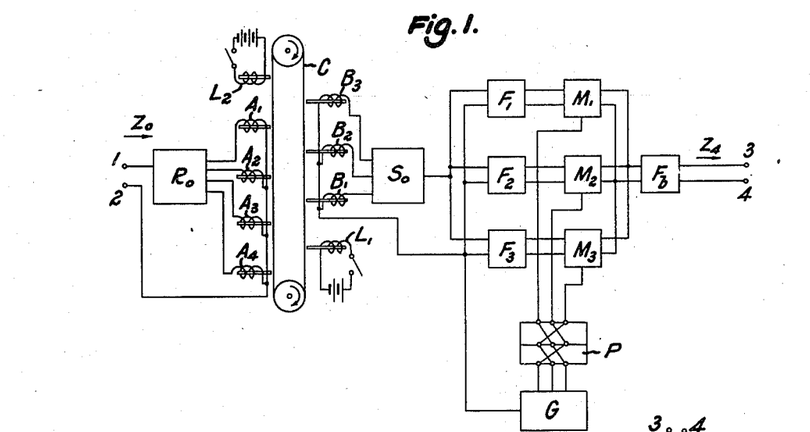
Fig. 1 is a schematic circuit diagram of apparatus for subjecting the elements in the several frequency bands to the same time transpositions and then to different frequency substitutions.

An apparatus for performing the method according to the invention is illustrated diagrammatically in Fig. 1. The message $Z_0$ which is to be scrambled is passed by means of the commutator $R_0$ in turn to the various recording magnets $A_1, A_2 \ldots$ of a steel tape retarding device, so that the signal elements appear in a different sequence as corresponding magnetisations on the moving tape C. The message is picked-up in turn by the magnets $B_1, B_2$ over the pick-up commutator $S_0$, so that at the exit of $S_0$ the transposition scrambled signal $Z_1$ appears. The magnetisations on the steel tape are erased by the wiping magnet $L_1$. It is preferable if the switching programs of $R_0$ and $S_0$ have unequal lengths so that the total scrambling program for signal $Z_1$ will be as long as possible. By means of filters $F_1, F_2, F_3$ the signal $Z_1$ is for instance divided into three frequency bands. By modulating the three bands with varying auxiliary frequencies from the generator G so called "summation" and "difference" frequencies appear at the exit of the three modulators $M_1, M_2, M_3$, whereby always only one frequency band of each modulation product falls within the passing range of filter $F_b$. The constant change in the auxiliary frequencies is produced by the switch device P. At the exit of $F_b$ the scrambled signal $Z_4$ is thus obtained, the components of which are shifted as regards time and frequency.

The scrambling of the signal elements and also the shifting of the frequency of the individual bands can naturally also be achieved by other known means.

For deciphering the scrambled message a similarly constructed device with the same commutation programs can be used, when the scrambled message enters at the terminals 3, 4 and the decoded message is picked up at the terminals 1, 2. Wiping magnet $L_1$ has to be replaced by wiping magnet $L_2$ and the retardation of the steel tape at the transmitting and receiving end has to be taken into account by a corresponding delayed drive for the commutator $R_0$. In order to obtain the necessary power special amplifiers may be used if required.

Figures 2, 3:
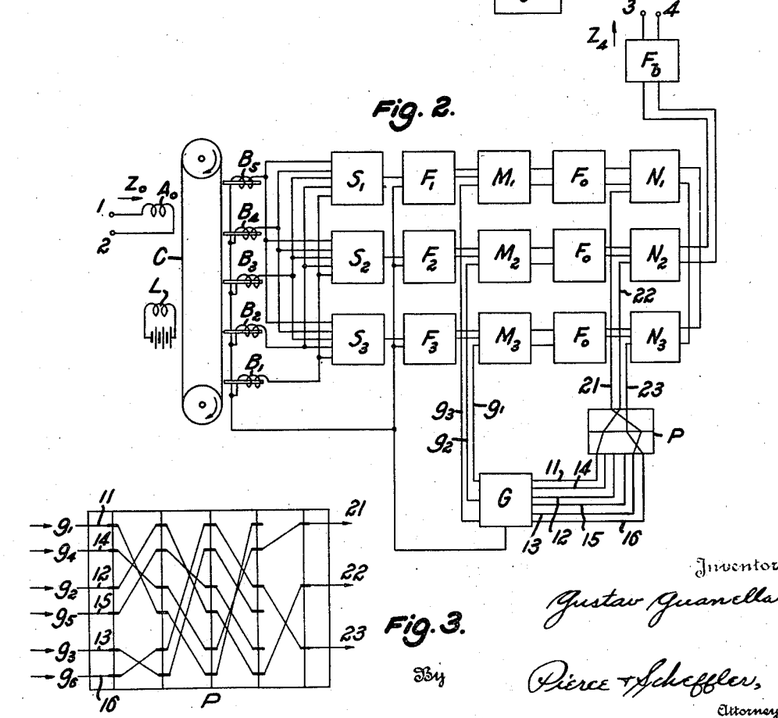
Fig. 2 is a similar diagram of apparatus for subjecting the elements in the several frequency bands to different time transpositions and then to different frequency substitutions.
Fig. 3 is a schematic diagram or development of a drum switch for varying the frequency substitutions in different groups of elements in the several bands.

With the arrangement shown in Fig. 2 the transposition programs for the individual frequency bands differ from each. The signal is recorded on the moving steel tape c by means of the recording magnet $A_0$ and is picked up by the magnets $B_1, B_2 \ldots$ The three separate pick-up switches $S_1, S_2, S_3$ operating in accordance with different programs are connected to the band filters $F_1, F_2, F_3$ so that at the outlet of these filters the three frequency bands of the signal $Z_2$ appear. By modulating these bands with constant auxiliary frequencies from the generator G these are shifted within the range of frequencies passing through the three same band filters $F_b$. A further modulation occurs in the modulators $N_1$, $N_2$, $N_3$ and the summation or difference frequencies thus formed are picked out by the filter $F_b$. By means of the change-over device P a variable transposition of the auxiliary frequencies occurs again so that the frequency band shifts of the modulators $N_1$, $N_2$, $N_3$ change after certain intervals of time. This frequency substitution after the undesirable difference or summation frequencies have been suppressed in the filter $F_b$, results in the scrambled signal $Z_5$ being obtained from the signal $Z_2$.

The commutation programs of switches $R_0$, $S_0$, $S_1$, $S_2$, $S_3$ in Figs. 1 and 2 have to be selected so that there are no gaps or overlapping when recording, and no omissions or repetitions when picking up the signal.

The auxiliary frequencies can be produced by means of magnet tone wheels which are actuated by the driving mechanism provided for the various switching devices. In order to increase the secrecy the elements from the second substitution in the modulators N can be subjected to a continuously changing transposition. Furthermore it can also be an advantage to undertake the transposition scrambling after instead of before the substitution scramblings.

The modulators M and N can be constructed in a very simple manner from dry rectifiers.

The change-over devices P can for instance be constructed in a known manner from several rotatable switch drums, each drum having contacts on both sides which are connected together in pairs by means of leads arranged as desired, so that by rotating one or more drums a constant change occurs in the auxiliary frequencies transmitted through the individual channels. If with a substitution scrambling also the inverse frequencies have to be formed, the six auxiliary frequencies which are then required for three frequency bands have to be dealt with in pairs in such a manner that at the outgoing drum terminals 21 to 23 of the four-stage drum switch shown in Fig. 3 only one of the frequencies of the frequency couples $g_1$ $g_4$ and $g_2$ $g_5$ and $g_3$ $g_6$ appears. By this means the inverse frequencies falling within the range of $F_0$ are obtained as difference frequencies with the modulation process for the upper three auxiliary frequencies.

With a frequency range of for instance 350–2450 cycles, for the message to be scrambled, the passing range of $F_0$ in Fig. 2 can for instance be fixed at 3150–3850 cycles. The auxiliary frequencies required for shifting the signal frequencies within this range will then be:

$g_1$=1400 cycles    $g_4$=5600 cycles
$g_2$=2100 cycles    $g_5$=4900 cycles
$g_3$=2800 cycles    $g_6$=4200 cycles These are all whole number multiples of 70 cycles so that it is easily possible to produce these frequencies by means of tone wheels with different numbers of teeth and a common drive.

With the arrangement shown in Fig. 2 deciphering is possible with the same apparatus and commutating plan, the signal passing through in the reverse direction. By following the scrambling and unscrambling of the individual components of the elements it is easy to prove that the original signal appears again. Component $a_3$ of element $a$ is for instance first delayed an element length by the scrambling switch $S_3$ at the transmitting end and then passed together with the auxiliary frequency $g_1$ to modulator $M_3$, so that at the outlet of filter $F_0$ the summation frequency band (1750–2450) cycles+1400 cycles=(3150–3850) cycles remains. By superimposing the auxiliary frequency $g_6$ the difference frequency 4200 cycles—(3150–3850) cycles=(1050–350) cycles is obtained at the exit of the modulator $N_3$. The element component $a_3$ thus appears in the scrambled signal $Z_5$ in the second place in the lowest frequency band as the inverse component $\bar{a}_3$. When $Z_5$ is deciphered, the component $\bar{a}_3$ together with the components $b_1$ $d_2$ contained in the same element are modulated in $N_3$ with the auxiliary frequency $g_6$. Of the resulting summation and difference frequencies the filter $F_0$ only transmits the difference frequency band 4200 cycles—(1050–350) cycles=3150–3850 cycles which consists of the frequency-shifted and inverse band $a_3$. By means of a further modulation with $g_1$ in $M_3$ the frequency band (3150–3850) cycles—1400 cycles=(1750–2450) cycles is formed. Component $a_3$ is therefore located in the third frequency band, just as in the original signal. Subsequent transposition with the scrambling switch $S_3$ brings this component back into the first place of the signal which now appears at the terminals 1, 2 and corresponds to the original totally delayed signal $Z_0$, because also the remaining components are now arranged in the original order again.

The transposition scrambling can also be arranged to be in the transmission paths of shifted frequency bands (3150–3850) cycles. For this purpose a number of retarding devices equal to the number of channels is necessary. An arrangement such as that shown in Fig. 4 can be used, the operation of which is readily understandable in view of the explanations already given. By forming the summation and difference frequencies with the modulators $M_1$–$M_3$ and the filters $F_0$, three frequency bands of the same range (3150–3850) cycles are obtained from the original frequency bands of signal $Z_0$ and the variable auxiliary frequencies due to the change-over in Q, the composition of said three frequency bands coinciding with the bands of signal $Z_3$. The unequal transposition scrambling of the three channels by means of the retarding devices $c_{1-3}$ and the scrambling keys $S_{1-3}$ results in three frequency bands of the same range, the composition of which coincides with the three bands of signal $Z_6$. A further substitution scrambling with the aid of change-over device P and modulators $N_{1-3}$ finally produces a scrambled signal with a composition the same as $Z_7$. When change-over device Q is omitted a scrambled signal according to $Z_5$ is obtained, whilst if P is omitted the signal will be like $Z_6$. If scrambling switches $S_{1-3}$ are out of operation a scrambled signal according to $Z_{10}$ will be received. Signal $Z_{10}$ can also be formed by using delay devices with constant delay times which are connected in turn into the various channels by a permutator switch, whilst one of the switches P or Q is omitted.

Figure 4:
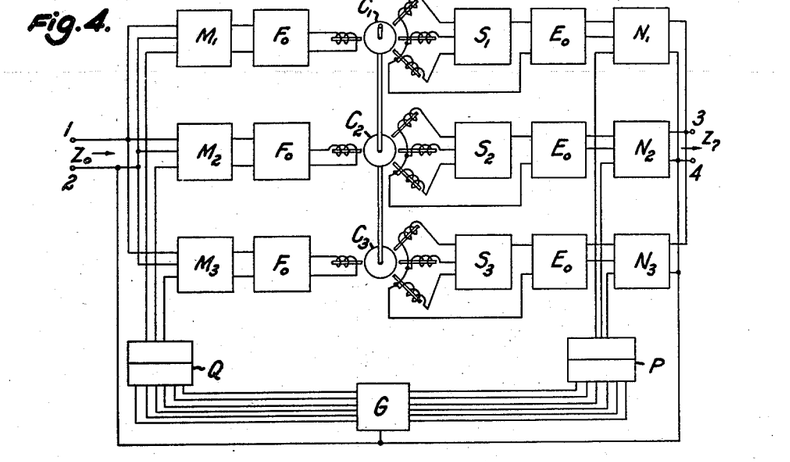
Fig. 4 is a diagram of apparatus for subjecting the successive band elements to different frequency substitutions and then subjecting the individual bands to different time transpositions.

In order to obtain a complete scrambling plan of as great a length as possible it is advisable to provide switching plans or programs of unequal length for the switches Q, P and S.

An advantage of transposition with separate retarding means, is that very small band widths can be used for storing the elements so that any distortion frequencies which may occur and generally lie outside of the transmitted band can easily be suppressed by special band filters $E_0$.

Special attention must be paid to the swinging-in time of the filters, this being large when the band width is small. It may therefore be advisable to locate all switches of the scrambling apparatus after the filters. If this is impossible the swinging-in times can to a certain extent be taken into account by a correspondingly delayed drive for the switching devices at the receiving end.

Figure 5:
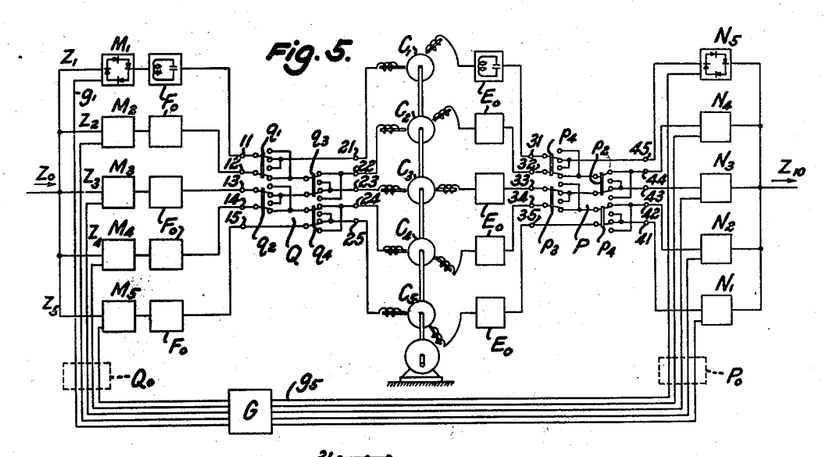
Fig. 5 is a diagram of apparatus for imposing different time delays upon individual frequency bands in which the elements were previously subjected to a frequency substitution or scrambling, then imposing a further frequency substitution upon the bands.
Figure 5A:
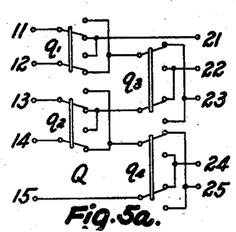
Figs. 5a and 5b are schematic diagrams of alternative permutation switches for changing the scheme of frequency-transposition.
Figure 5B:
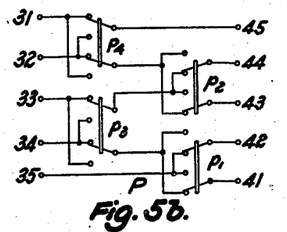

An arrangement where the delay times for the individual transposition scramblings are constant is shown in Fig. 5. Scrambling occurs here in five frequency bands of equal width. By means of modulators $M_{1-5}$ the difference frequencies are produced from the unscrambled message and the auxiliary frequencies $g_{1-5}$ from generator G. Filter $F_0$ serves to suppress the summation frequencies which are contained in the modulation products. The band width of these filters can be fixed at 3000–3500 cycles whilst the auxiliary frequencies are for instance as follows:

$g_1=3750$ cycles; $g_2=4250$ cycles;
$g_3=4750$ cycles; $g_4=5250$ cycles;
$g_5=5750$ cycles.

At the filter outlets, frequency bands are obtained which correspond to the following original bands:

$z_1=250$–750 cycles; $z_2=750$–1250 cycles;
$z_3=1250$–1750 cycles; $z_4=1750$–2250 cycles;
$z_5=2250$–2750 cycles.

The shifted frequency bands which all fall within the range 3000–3500 cycles are shifted in turn by means of the permutator switch Q. At the outlet terminals of this switch five frequency bands are thus obtained which are formed by alternate shifting of the five original frequency bands.

The five channels pass over five steel tape retarding devices $c_{1-5}$ with a common drive and whose constant delay times differ from each other by an element length. At least two retarding devices can be arranged so as to be over a common magnetisable support. The delayed signals can if necessary be freed from all noise frequencies outside the range of 3000–3500 cycles by means of band filters $E_0$.

An additional variable transposition of the channels is achieved by the further permutator switch P. By modulating the signals containing the frequencies 3000–3500 with the auxiliary frequencies $g_{1-5}$, five frequency bands each of 500 cycles width are obtained at the outlet of modulators $N_{1-5}$ which together again occupy the range of 250–2750 cycles and form the scrambled signal. The summation frequencies resulting from the modulation fall within the range over 6750 cycles and are suppressed if necessary by a low-pass filter in the outgoing conductor. The composition of a signal scrambled in this manner corresponds to signal $Z_{10}$ already described.

It is obvious that the permutator switches Q and P can be replaced by switches $Q_0$ and $P_0$ indicated by dotted lines in the drawings.

Figure 6:
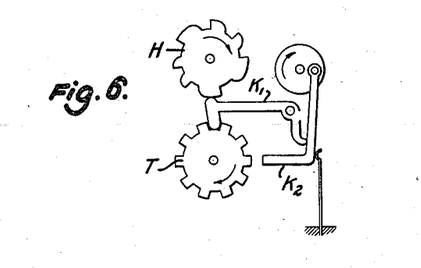
Fig. 6 is a diagrammatic view of driving mechanism for operating a permutator switch of the drum type.

When drum switches are used for the transposition of the individual channels an apparatus of the kind shown in Fig. 6 can be employed for operating the individual switch drums. The movement of each drum T is always positively determined by the pawls $K_1$, $K_2$. The movement is mechanically controlled by the ratchet wheel H which releases the locking pawl $K_1$ and brings driving pawl $K_2$ into engagement, so that the drum is moved forwards or backwards by means of this periodically actuated pawl until the next tooth on the ratchet wheel causes the drum to come to rest again.

The movement of the permutator switch can also be controlled by means of at least one perforated band. This possesses the advantage that the band can easily be changed and possesses a large period of operation which can be selected as desired.

Figure 7:
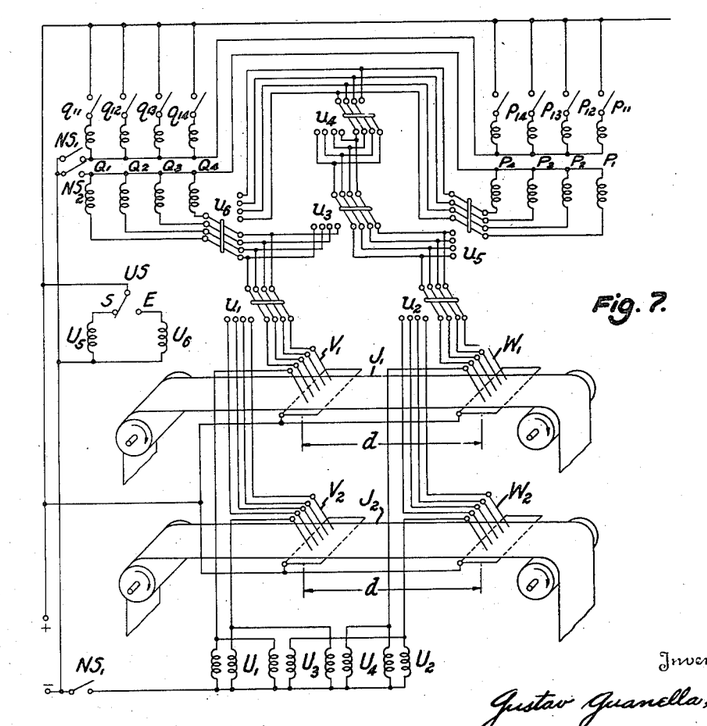
Figs. 7 and 8 are diagrams of relay systems, with perforated bands for controlling the program of selective relay actuation, for operating the permutator switching devices of the scrambling equipment.

Instead of the permutator drums other permutating switch devices can be provided, for instance relays which are controlled by scanning perforated bands. Such an arrangement is illustrated in Fig. 7. Both endless perforated bands $J_1$ and $J_2$ are electrically scanned at the two points $V_1$, $W_1$ and $V_2$, $W_2$ respectively. The front brush of each scanning device is connected to the excitation circuit of relays $U_{1-4}$, each of which is attracted when only one of both the oppositely wound coils is under current, that is when only one of the associated scanning contacts lies on a perforation. By means of the change-over contacts $u_1$, $u_2$ of the relays $U_1$, $U_2$ the remaining four scanning contacts at the scanning points $V_1$, $W_1$ and $V_2$, $W_2$ respectively are switched into the scanning circuit in a definite sequence. When scrambling, the transmitting-receiving change-over switch US is in the position indicated in the figure; this also applies to contacts $u_5$, $u_6$ of relays $U_5$, $U_6$. Relays $Q_{1-4}$ whose change-over contacts $q_{1-4}$ form the first permutating switch device Q are thus controlled in accordance with the scanning at $V_1$ and $V_2$. The control of relays $P_{1-4}$ of the permutator switch P is achieved, however, in dependence on the position of change-over contact $u_3$ of relay $U_3$ in a definite sequence alternately by the first or second scanning of the upper or lower perforated band. Furthermore the control currents can be alternately interchanged by the change-over contact $u_4$ of relay $U_4$.

The transposition of the five signal channels is achieved by means of the change-over contacts $q_{1-4}$ and $p_{1-4}$ of the relays $Q_{1-4}$ and $P_{1-4}$ respectively. In the excitation circuits of relays $U_{1-4}$, $Q_{1-4}$, $P_{1-4}$ and also in the holding current circuits of the two latter groups of relays are the cam contacts $NS_{1-3}$ actuated by the perforated bands. These contacts serve to render the scanning points free of current when the perforations change and at the same time to determine exactly the attraction and release torque of the various relays by means of a corresponding switching out of the holding currents and switching in of the scanning currents.

Figure 8:
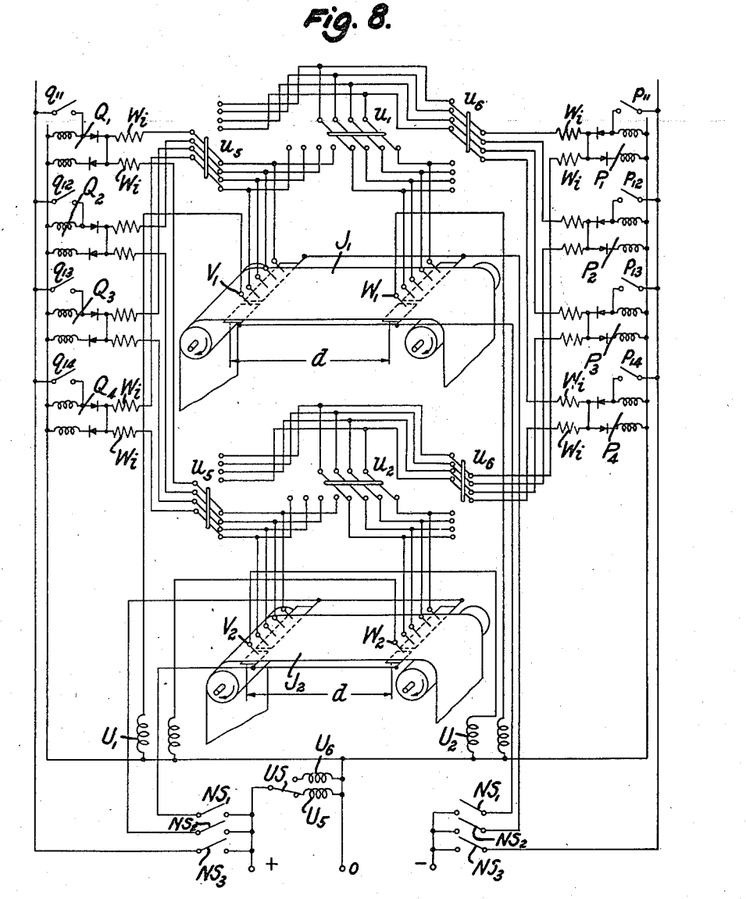

Another permutator switching device, also with perforated band control, is shown in Fig. 8. This device also contains two perforated bands $J_1$, $J_2$ each with two scanning devices $V_1$, $W_1$ and $V_2$, $W_2$ respectively. The change-over relays $Q_{1-4}$ and $P_{1-4}$ each contain two oppositely wound excitation windings with rectifier in series. One scanning contact of each band is connected over the same resistances $W_1$ with the windings of each relay. Since each band is scanned with a different polarity the excitation coils are without current when both the associated scanning contacts each cover a perforation of the band. When neither of the scanning contacts lies on the perforation there is also no current. If only one scanning contact lies on a perforation, one or the other excitation coil of the relay will have a current flowing through it depending on the scanning polarity and the direction of flow through the rectifier. The relay is attracted and remains in this position due to the action of the holding contacts $q_{11-14}$ and $p_{11-14}$, until the holding currents are interrupted by the cam switches $NS_1$. By means of the first scanning contact of each scanning device the relays $U_1$ $U_2$ are each controlled with two excitation coils wound in the same sense. These relays are always attracted when only one of both the associated contacts lies on a perforation. The change-over contacts $u_1$, $u_2$ of these relays effect a varying control of relays $P_{1-4}$ by means of the first or second scanning of the first or second perforated band respectively.

A reconstruction of the perforations in the bands by unauthorized persons is extremely difficult with this method of control, because even if a part of the message is deciphered it is impossible to tell how the corresponding control commands have to be apportioned between both the bands.

The bands are perforated with a prescribed text and the ends joined together to form an endless band. The number of signs on each band is different and can be selected within wide limits. With about 400 signs or perforations per band there will be a total period of $400^2 = 160,000$ element lengths. Assuming an element length of 0.1 second this period amounts to about 4.5 hours. By increasing the length of the band the period can be increased if necessary.

When using permutator drums or relays for the transposition of the signal channels electric transmission noises can occur due to dirty contacts or inaccurate contact making. This difficulty can be overcome by alternately switching in at least two change-over devices with the aid of cam switches, a change in the position of the change-over devices always occurring when there is no current flowing.

The arrangement shown in Fig. 5 can also be used for deciphering, without changing the direction of the signal. When using the permutator switch device shown in Figs. 7 and 8 it is only necessary to put over the change-over contacts $u_5$, $u_6$ of the relays $U_5$, $U_6$ by actuating the switch US. The control of permutator switches Q, P is thus changed over. Furthermore the control of the receiving switch P when compared with the control of the transmitting switch Q occurs with a time delay $t$ which corresponds to the time taken by the perforated band to travel the distance $d$ between both scanning points and at the same time to the total retardation of the storage devices $C_{1-5}$ of the transmitter or $C_{5-1}$ of the receiver. It is thus clear that by this means the unscrambled message will be obtained from the scrambled message when at the transmitting and receiving end similar perforated bands are used which are rotated in synchronism.

The method according to the invention can also be used for scrambling audible or inaudible impulse signals such as occur in telegraphy or teleprinting. Corresponding to the subdivision of the message to be scrambled into a number of frequency channels, there are thus several transmission channels available whose scrambling plans are different. With the arrangement shown in Fig. 5 five different modulated telegraphic messages or telegrams can for instance be transmitted simultaneously whose carriers are for instance fixed at 500, 1000, 1500, 2000, 2500 cycles. If only one telegram has to be transmitted it is expedient to arrange the scanning so that the telegraph current is switched over between two fixed frequencies, for instance 500 and 1000 cycles, one frequency serving as the signal current and the other frequency as the pause current. Unauthorized deciphering appears impossible, even when ordinary modulated telegraph currents which have interruptions corresponding to the pause signals are scrambled. Modulated or audible telegraph currents can be generated by means of tone wheels which are actuated together with the auxiliary frequency generators of the scrambling device. For scanning with inaudible telegraph signals, these signals can be passed to the tone wheels in question as excitations currents.

It is of special importance that there should be exact synchronism between the scrambling and deciphering apparatus. According to a known method a fine synchronisation can be obtained with the aid of synchronising signs which are transmitted at short intervals. Before transmission commences the perforated bands and the driving mechanism for the various switching devices are made to coincide in a certain position which is determined for each individual case. After both machines have commenced to run in synchronism the transmitter gives the order to switch in, whereupon the drive for the band and the change-over switches is put into operation simultaneously at the transmitting and receiving end. In order to determine exactly the moment when this putting into operation should occur special coarse synchronising signals can be transmitted periodically and the apparatus is then coupled when the first coarse synchronising signal is received after the switch-in order. Various synchronising systems are known which are suitable for synchronising and also maintaining in synchronism scrambling and unscrambling apparatus.

I claim:

1. Method of scrambling messages which comprises dividing the message into a plurality of frequency bands, subjecting the elements of recurrent groups of signal elements of the individual message frequency bands to a time-delayed scrambling, and subjecting elements of recurrent groups of signal elements in the bands to a frequency-substitution scrambling.

2. Method as in claim 1, wherein the time-delay scrambling is imposed upon the original message to form an intermediate signal therefrom by changing the sequence of the message elements, and the frequency-substitution scrambling is imposed upon the elements of the frequency bands of said intermediate signal to shift the same by varying frequency amounts in order to produce the scrambled message.

3. Method as in claim 1, wherein the frequency-substitution scrambling is imposed upon the elements of the message frequency bands to form an intermediate signal from the original message by shifting the elements of its frequency bands by varying amounts of frequency, and the time-delayed scrambling is imposed upon the elements of said intermediate signal to change their sequence in order to produce the scrambled message.

4. Method as in claim 1, wherein different time-delay scramblings are imposed upon the individual frequency bands, whereby an intermediate signal is formed from the original message by altering the sequence of the elements of the individual frequency bands according to different plans, and the frequency-substitution scrambling is imposed upon the elements of the frequency bands of said intermediate signal whereby the elements are shifted by varying amounts of frequency in order to produce the scrambled message.

5. Method as in claim 1 wherein different time-delay scramblings are imposed upon the message frequency bands to alter the sequence of the elements of the individual frequency bands of the original message according to unequal plans to form a first intermediate signal, and the frequency-substitution scrambling is imposed upon the elements of the frequency bands of the first intermediate signal to shift the same by varying frequency amounts so that a second intermediate signal is formed, in combination with the step of imposing a time-delayed scrambling upon the second intermediate signal to alter the sequence of the elements of its individual frequency bands according to different plans.

6. Method as in claim 1, characterized by the feature that the frequency-substitution scrambling shifts the frequency bands of the original message by varying amounts of frequency to form a first intermediate signal, and the time-delayed scrambling alters the sequence of the elements of the individual frequency bands according to different plans to form a second intermediate signal, in combination with the step of imposing a frequency-substitution scrambling upon the elements of the frequency bands of said second intermediate signal to shift the same by varying frequency amounts in order to form the scrambled message.

7. Method as in claim 1, characterized by the feature that the time-delay scrambling alters the sequence of the elements of the individual frequency bands of the original message to form a first intermediate signal, and the frequency-substitution scrambling is imposed upon the elements of the frequency bands of the first intermediate signal to shift the same by constant frequency amounts so that a second intermediate signal is formed in combination with the step of imposing a time-delay scrambling upon the second intermediate signal to alter the sequence of the elements of the individual frequency bands according to different plans.

8. Method as in claim 1, characterized by the feature that the frequency-substitution scrambling shifts the frequency bands of the original message by varying amounts of frequency whereby a first intermediate signal is formed, and the time-delay scrambling shifts elements of the individual frequency bands of said first signal as regards time by unequal but constant amounts so as to form a second intermediate signal in combination with the step of imposing a frequency-substitution scrambling upon the second intermediate signal to shift elements thereof by varying amounts of frequency to form the scrambled signal.

9. Method as in claim 1, characterized by the feature that the time-delay scrambling alters the sequence of the elements of the frequency bands of the original message according to different plans, whereby an intermediate signal is formed, and the frequency-substitution scrambling is imposed upon the intermediate signal in order to scramble the message by shifting the elements of the frequency bands by unequal amounts of frequency within the same frequency range, in combination with the steps of imposing a second time-delay scrambling and a second frequency-substitution scrambling, whereby the elements are again variably transposed and subjected to a further frequency shift by unequal amounts of frequency.

10. Method as in claim 1, characterized by the feature that one of said scramblings is varied in different frequency bands according to recurrent cyclic plans, and that two plans for shifting elements of the individual frequency bands have unequal periods.

11. Method as in claim 1, characterized by the feature that the time-delay and frequency-substitution scramblings are imposed upon elements of the individual frequency bands that are of different length.

12. Method as in claim 1, characterized by the feature that frequency-substitution scrambling of elements of the frequency bands by varying amounts of frequency comprises modulating said frequency bands with different auxiliary frequencies for different elements of a frequency band.

13. Method as in claim 1, characterized by the feature that frequency-substitution scrambling to effect the shifting of the frequency bands by varying amounts of frequency is accomplished by transposing the frequency bands and by modulating with constant auxiliary frequencies.

14. Method as in claim 1, characterized by the feature that frequency-substitution scrambling to effect the shifting of the frequency bands by varying amounts of frequency is achieved by modulating with constant auxiliary frequencies and transposing the modulation products.

15. Method as in claim 1, characterized by the feature that frequency-substitution scrambling to effect the shifting of the frequency bands within the same frequency range is achieved by modulating with constant auxiliary frequencies, the modulation products then being variably transposed.

16. Method as in claim 1, characterized by the feature that the frequency-substitution scrambling imposes auxiliary frequencies upon the individual frequency bands to form frequency-transposed elements comprising the modulation products, the summation frequencies and the difference frequencies respectively of the modulation products being suppressed alternately in a definite sequence by filters.

17. Method as in claim 1, characterized by the feature that the frequency band shifts of the frequency-substitution scrambling are so selected that the scrambled message is in a different frequency range of the same total band width as the original message.

18. Method as in claim 1, characterized by the feature that the frequency bands are shifted by such amounts of frequency that the scrambled message has the same total frequency range as the original message.

19. In a signalling system in which secrecy is obtained by subjecting the message to scramblings of the time-delay type and the frequency-substitution type, the method which comprises imposing upon the message a scrambling of one type, and imposing upon the message a plurality of scramblings of the other type.

20. In a signalling system, the invention as recited in claim 19, wherein the scramblings of different types are imposed upon the message in alternation.

21. In a signalling system, the invention as recited in claim 19, wherein two scramblings of the same type are imposed in succession upon the message.

22. In a signalling system in which secrecy is obtained by a plurality of transpositions of components of the message to produce a scrambled signal for transmission, the method which comprises shifting frequency bands of the original message by unequal amounts to form a first intermediate signal having the same frequency range as the original signal, subjecting the elements of the frequency bands of the intermediate signal to time-delay scramblings that vary in a recurring cycle to obtain a second intermediate signal, and subjecting elements of the frequency bands of the second intermediate signal to frequency-substitution scramblings that vary in recurring cycles to effect a further scrambling of the message.

23. In apparatus for the secret transmission and reception of messages, the combination with means for imposing different time-delays upon successive elements of a message, of means for imposing different frequency transpositions upon elements in different frquency bands of the message, thereby to scramble a message to be transmitted or to unscramble a received scrambled message.

24. In apparatus for the secret transmission and reception of messages, the invention as recited in claim 23, wherein said first means imposes different time delays upon successive elements to alter the sequence thereof, in combination with periodically actuated means for changing the time delays imposed on successive elements, thereby to vary the sequence of the time-delayed elements.

25. In apparatus for the secret transmission and reception of messages, the invention as recited in claim 23, in combination with means for periodically changing the amounts of frequency transpositions imposed on successive elements in the respective frequency bands.

26. In apparatus for the secret transmission and reception of messages, the invention as recited in claim 23, wherein the respective scrambling means divide the message into elements of different length.

27. Apparatus for the secret transmission and reception of messages, said apparatus being of the type that includes means for transposing or inverting elements in different frequency bands, and means for altering the time relation of elements in different frequency bands, characterized by the fact that said apparatus includes permutator switch means for periodically adjusting one of said means to alter the transpositions effected thereby.

28. Apparatus for the secret transmission and reception of messages, said apparatus being of the type that includes means for transposing or inverting elements in different frequency bands, and means for altering the time relation of elements in different frequency bands, characterized by the fact that said apparatus includes permutator switch means of drum type for periodically adjusting one of said means to alter the transpositions effected thereby.

29. Apparatus for the secret transmission and reception of messages, said apparatus being of the type that includes means for transposing or inverting elements in different frequency bands, and means for altering the time relation of elements in different frequency bands, characterized by the fact that said apparatus includes permutator switch means of relay type for periodically adjusting one of said means to alter the transpositions effected thereby.

30. Apparatus for the secret transmission and reception of messages, said apparatus being of the type that includes means for transposing or inverting elements in different frequency bands, and means for altering the time relation of elements in different frequency bands, characterized by the fact that said apparatus includes permutator switch means for periodically adjusting one of said means to alter the transpositions effected thereby, and control means including perforated bands and means for scanning the same to actuate said permutator switch means.

31. Apparatus for the secret transmission and reception of messages, said apparatus being of the type that includes means for transposing or inverting elements in different frequency bands, and means for altering the time relation of elements in different frequency bands, characterized by the fact that said apparatus includes switch means for adjusting at least one of said scrambling means to alter the transpositions effected thereby, polarized relays for actuating said switch means, and a pair of perforated bands and scanning means for controlling said polarized relays; each relay being energized when the associated scanning means is over an opening of only one of said bands, and being non-operative when the associated scanning means is over openings in both bands or over imperforate portions of both bands.

GUSTAV GUANELLA.